United States Patent
Zhou et al.

(10) Patent No.: US 9,853,808 B2
(45) Date of Patent: Dec. 26, 2017

(54) USER EQUIPMENT, INITIAL CELL SEARCHING METHOD AND APPARATUS THEREOF

(71) Applicant: Spreadtrum Communications (Shanghai) Co., Ltd., Shanghai (CN)

(72) Inventors: Yongfang Zhou, Shanghai (CN); Fajun Yan, Shanghai (CN); Xiaojian Dong, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 151 days.

(21) Appl. No.: 14/399,415

(22) PCT Filed: Nov. 21, 2013

(86) PCT No.: PCT/CN2013/087595
§ 371 (c)(1),
(2) Date: Nov. 6, 2014

(87) PCT Pub. No.: WO2015/074210
PCT Pub. Date: May 28, 2015

(65) Prior Publication Data
US 2016/0277176 A1    Sep. 22, 2016

(51) Int. Cl.
*H04L 7/04* (2006.01)
*H04B 1/7083* (2011.01)
(Continued)

(52) U.S. Cl.
CPC ........... *H04L 7/042* (2013.01); *H04B 1/7083* (2013.01); *H04J 11/0069* (2013.01);
(Continued)

(58) Field of Classification Search
CPC ......... H04L 7/042; H04L 27/26; H04L 48/16; H04J 11/0069; H04W 88/02; H04W 48/16; H04W 56/00; H04B 1/7083
See application file for complete search history.

(56) References Cited

U.S. PATENT DOCUMENTS 6,359,938 B1 * 3/2002 Keevill ................. H04L 1/0054
370/206
6,965,586 B1 * 11/2005 Maruyama ......... H04B 1/70735
370/335
(Continued)

FOREIGN PATENT DOCUMENTS

CN    101858939    10/2010
CN    102185633    9/2011
(Continued)

OTHER PUBLICATIONS

PCT International Search Report dated Jun. 11, 2014, PCT Patent Application PCT/CN2013/087595.
(Continued)

*Primary Examiner* — Luat Phung
*Assistant Examiner* — Thomas R Cairns
(74) *Attorney, Agent, or Firm* — Vierra Magen Marcus LLP (57) ABSTRACT

An initial cell searching method includes: receiving at least one frame data sequence including synchronization channel signals; performing a correlation process between all synchronization sequences stored in user equipment and the received at least one data sequence to obtain correlation sequences, and calculating correlation power sequences corresponding to each of the correlation sequences; searching a highest peak and a secondary peak for each of the correlation power sequences, and recording the highest peak and corresponding position and the secondary peak and corresponding position; and determining a target cell ID based on a first target sequence. which corresponds to a synchronization sequence corresponding to a correlation power sequence of which a relative distance between the corresponding position of the highest peak and the corresponding position of the secondary peak meets a condition, and the highest peak of the correlation power sequence has (Continued)

a maximum peak value among highest peaks of all the correlation power sequences.

23 Claims, 7 Drawing Sheets

(51) Int. Cl.
  *H04J 11/00* (2006.01)
  *H04L 27/26* (2006.01)
  *H04W 48/16* (2009.01)
  *H04W 56/00* (2009.01)
  *H04W 88/02* (2009.01)
(52) U.S. Cl.
  CPC ............ *H04L 27/26* (2013.01); *H04W 48/16* (2013.01); *H04W 56/00* (2013.01); *H04W 88/02* (2013.01)

(56) References Cited

U.S. PATENT DOCUMENTS

| | | | | |
|---|---|---|---|---|
| 7,151,944 | B2* | 12/2006 | Hashem | H04W 56/0045 375/E1.032 |
| 7,336,699 | B2* | 2/2008 | Mathew | H04B 1/70735 370/320 |
| 9,014,310 | B2* | 4/2015 | Park | H04B 1/30 375/316 |
| 9,107,158 | B2* | 8/2015 | Yang | H04W 56/003 |
| 9,184,794 | B1* | 11/2015 | Ibrahim | H04L 7/042 |
| 2004/0202229 | A1 | 10/2004 | Raphaeli et al. | |
| 2012/0134322 | A1* | 5/2012 | Buda | H04J 11/0069 370/328 |
| 2014/0070991 | A1* | 3/2014 | Liu | G01S 19/22 342/357.63 |

FOREIGN PATENT DOCUMENTS

| | | |
|---|---|---|
| CN | 103188195 | 7/2013 |
| EP | 2226964 A1 | 9/2010 |

OTHER PUBLICATIONS

PCT Written Opinion of the International Searching Authority dated Jun. 24, 2014, PCT Patent Application PCT/CN2013/087595.
English Abstract of Chinese Patent Application No. CN101858939.
English Abstract of Chinese Patent Application No. CN102185633.
English Abstract of Chinese Patent Application No. CN103188195.
Extended European Search Report dated Aug. 29, 2016 in European Application No. 138843800.

* cited by examiner

USER EQUIPMENT, INITIAL CELL SEARCHING METHOD AND APPARATUS THEREOF

The present application is a Section 371 National Stage Application of International Application No. PCT/CN2013/087595, filed on Nov. 21, 2013, the entire disclosure of which is incorporated herein by reference in its entirety.

TECHNICAL FIELD

The present disclosure generally relates to communication technologies, and more particularly, to a user equipment, an initial cell searching method and an apparatus thereof.

BACKGROUND

In a communication system, a user equipment needs to search for a cell after being powered on. Cell searching is a process from the user equipment being powered on to an appropriate cell being determined. Specifically, when the user equipment is powered on, it needs to search for available cells and determine an appropriate cell to register in. Only after the user equipment succeeds in registering in a cell, it can obtain information of the current cell and its neighboring cells, and monitor paging information in the network or originate a call to establish a communication connection.

An initial cell searching, as a beginning of cell searching, is to achieve downlink synchronization and to obtain information, such as a cell identification (ID) etc. Typically, the initial cell searching includes, based on a slide correlation between synchronization sequences defined by a system which are stored in a local user equipment and received signals, finding the highest correlation peaks (referred to as the highest peaks) of these synchronization sequences, comparing the highest peaks with each other to determine a particular synchronization sequence with the maximum peak value. The particular synchronization sequence corresponds to a target cell ID.

However, due to a multi-path fading environment and variance in system sampling, a correlated highest peak of the actually transmitted synchronization sequence is usually not the maximum value among the highest peaks of all the synchronization sequences, which may lead to the user equipment obtaining an erroneous cell ID. As a result, the subsequent cell searching process may be further affected, such as, cell information can not be recognized correctly, which all may lead to failure in cell searching.

SUMMARY

Embodiments of the present disclosure provide an initial cell searching method and an apparatus thereof to obviate influence of multi-path fading and variance in sampling on identification of cell identification (ID), so as to improve probability of success in cell searching in the case of low signal noise ratio (SNR).

In one embodiment, an initial cell searching method of a user equipment is provided. The method includes:
receiving at least one frame data sequence including synchronization channel signals;
performing a correlation process between all synchronization sequences stored in the user equipment and the received at least one frame data sequence to obtain correlation sequences, and calculating correlation power sequences corresponding to each of the correlation sequences;
searching a highest peak and a secondary peak for each of the correlation power sequences, and recording the highest peak and its corresponding position and the secondary peak and its corresponding position; and
determining a target cell ID based on a first target sequence, wherein the first target sequence corresponds to a synchronization sequence corresponding to a correlation power sequence of which a relative distance between the corresponding position of the highest peak and the corresponding position of the secondary peak meets a predetermined condition, and the highest peak of the correlation power sequence has a maximum peak value among all highest peaks of the correlation power sequences.

In some embodiments, the relative distance between the corresponding position of the highest peak and the corresponding position of the secondary peak meeting a predetermined condition includes that: the absolute difference between the relative distance between the corresponding position of the highest peak and the corresponding position of the secondary peak and the length of the synchronization sequence is less than a predetermined threshold.

In some embodiments, the method further includes: if the first target sequence does not exist, determining the target cell ID based on a second target sequence, wherein the second target sequence corresponds to a synchronization sequence corresponding to a correlation power sequence having a maximum highest peak among all the correlation power sequences which fail to meet the predetermined condition.

In some embodiments, the method further includes: the corresponding position of the highest peak of the correlation power sequence corresponding to the synchronization sequence which is used to determine the target cell ID is determined to be a synchronization timing position.

In some embodiments, wherein performing a correlation process includes: performing a slide correlation successively between waveform datas in time domain of all the synchronization sequences and the received at least one frame data sequence; or, transforming all the synchronization sequences and the received at least one frame data sequence into frequency domain and performing a dot product of the transformed data sequences in frequency domain.

In some embodiments, the method further includes: before searching the highest peak and the secondary peak for each of the correlation power sequences, calculating normalized power values of all the correlation power values to obtain normalized power values, wherein searching the highest peak and the secondary peak for each of the correlation power sequences comprises searching a maximum value of the normalized power and a second maximum value of the normalized power for each of the correlation power sequences.

In some embodiments, the normalized power of the correlation power sequence is a ratio of each element of the correlation power sequence to a power sum of a corresponding received data sequence in a correlation length.

In some embodiments, the method further includes: calculating a correlation power sequence for each of the received at least one frame data sequences; and performing a first superposition processing on the maximum of the normalized power and the second maximum of the normalized power for all the calculated correlation power sequences, respectively, to obtain a superposition processed maximum of the normalized power and a superposition processed second maximum of the normalized power, wherein the superposition processed maximum of the normalized power and its corresponding position serve as the highest peak and its corresponding position, and the superposition processed second maximum of the normalized power and its corresponding position serve as the secondary peak and its corresponding position.

In some embodiments, searching the highest peak and the secondary peak for each of the correlation power sequences comprises searching a maximum power value and a second maximum power value for each of the correlation power sequences.

In some embodiments, the method further includes: calculating a correlation power sequence for each of the received at least one frame data sequences; and performing a second superposition processing on the maximum power values and the second maximum power values for all the calculated correlation power sequences, respectively, to obtain a superposition processed maximum power and a superposition processed second maximum power, wherein the superposition processed maximum power and its corresponding position serve as the highest peak and its corresponding position, and the superposition processed second maximum power and its corresponding position serve as the secondary peak and its corresponding position.

In some embodiments, the method further includes: segmenting each of the synchronization sequences, wherein the correlation process is performed between the segmented synchronization sequences and the received at least one frame data sequence.

In some embodiments, the method further includes: before performing the correlation process, performing a third superposition processing on each of the received at least one frame data sequences, wherein the correlation process is performed between the synchronization sequences and the data sequences which have been processed with the third superposition.

In some embodiments, the method further includes: calculating a correlation power sequence for each of the received at least one frame data sequences; and, performing a fourth superposition processing on all the correlation power sequences for each of the at least one frame data sequences, wherein searching the highest peak and the secondary peak for each of the correlation power sequences includes searching a highest peak and a secondary peak for each of the correlation power sequences which has been processed with the fourth superposition.

In some embodiments, the method further includes: searching a first target sequence for each of the received at least one frame data sequences; and comparing the highest peak for all the searched first target sequences to obtain the maximum highest peaks, wherein the first target sequence having a maximum highest peak is used to determine the target cell ID.

In some embodiments, the method further includes: scanning more than one frequency point to search the first target sequence on each of the more than one frequency point; comparing the highest peaks for all the searched first target sequences to obtain a maximum highest peak, wherein the first target sequence having the maximum highest peak is used to determine the target cell ID.

In some embodiments, the method further includes: if no first target sequence is found on all frequency points, comparing the highest peaks for all the second target sequences to obtain a maximum highest peak, wherein the second target sequence having the maximum highest peak is used to determine the target cell ID, wherein the second target sequence corresponds to a synchronization sequence corresponding to a correlation power sequence having a maximum highest peak among all the correlation power sequences on each frequency point which fail to meet the predetermined condition.

In some embodiments, the synchronization sequence maps to a frequency domain position on the synchronization channel in an alternate way, where mapping in an alternate way means that the synchronization sequence is mapped only to an odd-numbered sub-carrier or to an even-numbered sub-carrier.

In one embodiment, an initial cell searching apparatus of a user equipment is provided. The initial cell searching apparatus includes:

a receiving unit, configured to receive at least one frame data sequence including synchronization channel signals;

a first calculating unit, configured to perform a correlation process between all synchronization sequences stored in the user equipment and the received data sequence to obtain correlation sequences, and calculate on each of the correlation sequences to obtain corresponding correlation power sequences;

a searching unit, configured to search a highest peak and a secondary peak for each of the correlation power sequences, and record the highest peak and its corresponding position and the secondary peak and its corresponding position; and a detection unit, configured to determine a target cell ID based on a first target sequence, wherein the first target sequence corresponds to a synchronization sequence corresponding to a correlation power sequence of which a relative distance between the corresponding position of the highest peak and the corresponding position of the secondary peak meets a predetermined condition, and the highest peak of the correlation power sequence has a maximum peak value among all highest peaks of the correlation power sequences.

In one embodiment, a user equipment including an initial cell searching apparatus of a user equipment as described above is provided.

Compared with the prior art, embodiments of the present disclosure have the following advantages.

Utilizing the characteristics that the synchronization signal has a repeated waveform in time domain, the method searches the highest peak and the secondary peak for each of the correlation sequences between the synchronization sequences and the received at least one frame data sequence, and records the highest peak and the secondary peak. Whether or not the relative position between the highest peak and the secondary peak conform to a dual-peak relative position serves as another condition to improve accuracy of identification of cell ID in the case of low signal noise ratio. As a result, the influence of multi-path fading and variance in system sampling can be obviated and the probability of success in cell searching can be improved.

In addition, as searching of the secondary peak and the highest peak are performed simultaneously, which add little extra computation amount.

DETAILED DESCRIPTION

According to an existing cell searching method, synchronization sequences defined by a system are stored in a local user equipment. The synchronization sequences are slide correlated with received signals successively to find out highest peaks. Then, all of the highest peaks of the synchronization sequences are compared with each other to determine a highest peak having a maximum peak value. The synchronization sequence with the highest peak having the maximum peak value is considered as the target synchronization sequence. The peak location corresponds to the position of a synchronization channel, and the target synchronization sequence corresponds to a target cell identification (ID).

The initial cell searching mentioned above includes two key points. The first is to find out a correct position of the synchronization channel to perform frame synchronization; and the second is to determine correct cell ID information, then to analyze more detailed information based on the correct cell ID information.

However, in the case of low signal noise ratio, due to multi-path fading and variance in sampling, some actual correlated highest peaks of the synchronization sequences do not have the maximum value of all the synchronization sequences, which leads to the user equipment searching for an erroneous cell ID, and in turn the cell information can not be recognized correctly and the cell searching fails. Accordingly, to improve the accurate identification rate of cell ID is of great significance.

For an actual launch sequence, if the launch sequence has a repeated waveform in time domain, a correlated power sequence may have an obvious dual-peak waveform despite that the correlated highest peak may not have the maximum value. That is, in a fixed relative position (i.e. a fixed distance equal to a length of the synchronization sequence), the highest peak and the secondary peak can coexist. Therefore, if the dual-peak waveform is utilized properly, the probability of success in cell searching can be improved considerably.

Based on the theory mentioned above, embodiments of the present disclosure provide an initial cell searching method of a user equipment. By utilizing the characteristics that the synchronization sequence transmitted by a base station takes a repeated waveform in time domain, the secondary highest peak is recorded in search of the correlated highest peak between each synchronization sequence and received data sequence. Thus, whether or not the relative position between the highest peak and the secondary peak conform to a dual-peak relative position is determined, which facilitates to improve accuracy of identification of cell ID. As a result, the influence of multi-path fading and variance in sampling can be obviated and the probability of success in cell searching in the case of low signal noise ratio can be raised.

Figure 1:
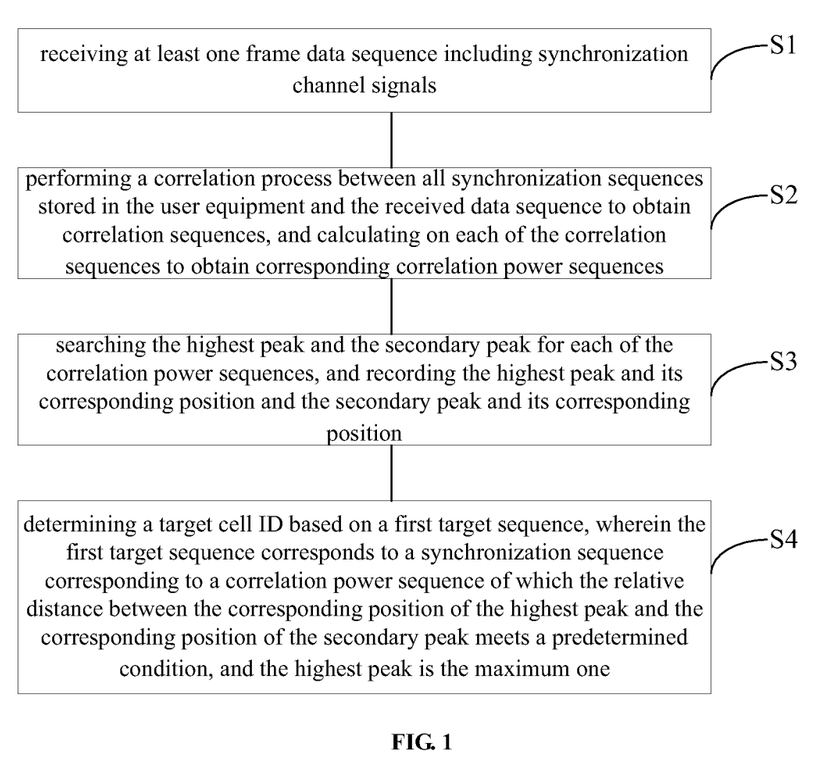
FIG. 1 schematically illustrates a flow chart of an initial cell searching method according to an embodiment of the present disclosure.

Referring to FIG. 1, FIG. 1 schematically illustrates a flow chart of an initial cell searching method according to an embodiment of the present disclosure.

The initial cell searching method of a user equipment includes steps of S1 to S4.

S1, receiving at least one frame data sequence including synchronization channel signals;

S2, performing a correlation process between all synchronization sequences stored in the user equipment and the received at least one frame data sequence to obtain correlation sequences, and calculate correlation power sequences corresponding to each of the correlation sequences;

S3, searching a highest peak and a secondary peak for each of the correlation power sequences, and record the highest peak and its corresponding position and the secondary peak and its corresponding position; and S4, determining a target cell ID based on a first target sequence, wherein the first target sequence corresponds to a synchronization sequence corresponding to a correlation power sequence of which a relative distance between the corresponding position of the highest peak and the corresponding position of the secondary peak meets a predetermined condition, and the highest peak of the correlation power sequence has a maximum peak value among all highest peaks of the correlation power sequences.

In some embodiments, the initial cell searching method of a user equipment further includes: if the first target sequence does not exist, determining the target cell ID based on a second target sequence, wherein the second target sequence corresponds to a synchronization sequence corresponding to a correlation power sequence having a maximum highest peak among all the correlation power sequences which fail to meet the predetermined condition.

In addition, when the target cell ID is determined, the corresponding position of the highest peak of the correlation power sequence corresponding to the synchronization sequence which is used to determine the target cell ID is determined to be a synchronization timing position.

In order to clarify the objects, characteristics and advantages of the disclosure, the embodiments of the present disclosure will be described in detail in conjunction with the accompanying drawings.

In some embodiments, the user equipment may be a communication terminal held by a user in a communication system, which may include, such as, a mobile phone, a notebook computer or a handheld computer etc. The communication system may be a time division-synchronous code division multiple access (TD-SCDMA) system, or a long term evolution (LTE) system, or any other system adopting a similar cell searching method.

The "cell ID" used in the present description, is known as physical-layer cell identity (PCI), which is a physical layer identity corresponding to a base station of a current network or a sector belonging to the base station. The cell ID corresponds to a sequence of synchronization code, a pilot code and a scrambling code. A communication terminal can identify cell signals based on the cell ID.

For example, in TD-SCDMA system, the whole system has 32 downlink synchronization codes (SYNC-DL), 128 midamble codes, and 128 scrambling codes. The midamble codes correspond to the scrambling codes one to one, and each of the SYNC-DL codes corresponds to 4 particular midamble codes. Therefore, the index (serial number) of the SYNC-DL codes, the Midamble code or the scrambling code may serve as the physical-layer cell identity (PCI), and be used to identify cell signals by the communication terminal.

Similarly, 504 physical-layer cell identities are defined in LTE system. Each PCI corresponds to a particular downlink reference signal sequence. The 504 PCI are divided into 168 groups, which corresponds to NID(1) according to LTE communication protocol, and each group includes 3 cell IDs, which corresponds to NID(2) according to LTE communication protocol. In LTE system, two downlink synchronization signals are defined, wherein one is primary synchronization signal (PSS), another is secondary synchronization signal (SSS). The PSS is assigned with 3 values, each of which corresponds to 3 different Zadoff-Chu sequences. And each Zadoff-Chu sequence corresponds to one NID(2). The SSS has 168 values, which correspond to NID(1). The terminal detects PSS to determine NID(2). Further, the terminal detects SSS to determine NID(1). Thus, PCI is determined based on the NID(1) and NID(2).

In the specification, that the initial cell searching method of a user equipment can be implemented effectively is based on the ground that the synchronization sequence transmitted from the base station has a repeated waveform in time domain. Specifically, if a number $N_{sync}$ of synchronization sequences are defined by a communication system, and if one of the $N_{sync}$ synchronization sequences is transmitted on a synchronization channel, the synchronization sequence needs to map to a frequency domain position on the synchronization channel in an alternate way. Mapping in an alternate way means that the synchronization sequence is mapped only to an odd-numbered sub-carrier or to an even-numbered sub-carrier, such that the synchronization signal contained in the time domain data received by the user equipment has a repeated waveform in time domain.

Figure 2:
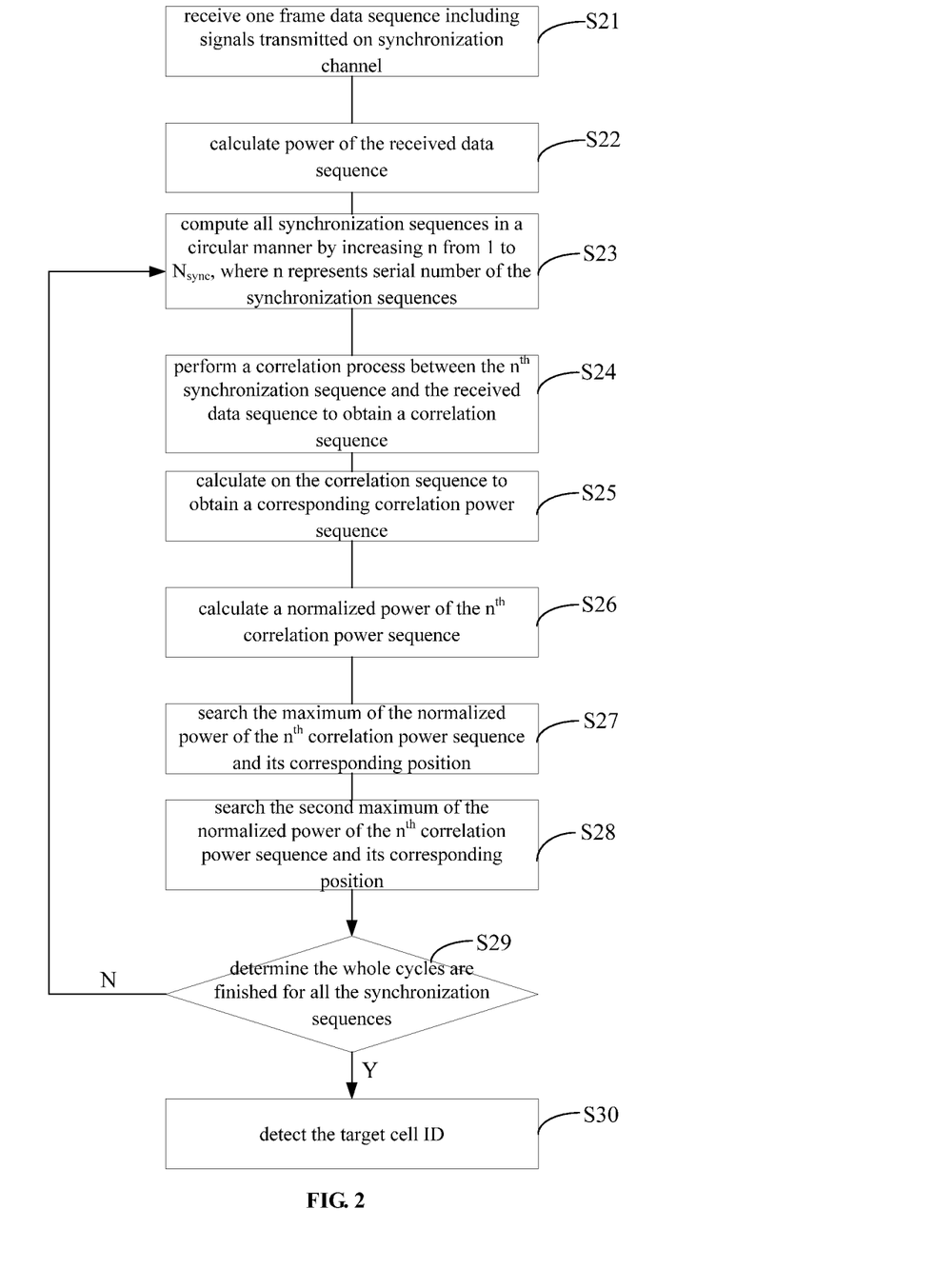
FIG. 2 schematically illustrates a flow chart of an initial cell searching method according to another embodiment of the present disclosure.

Hereunder, the initial cell searching method of a user equipment is described in detail in conjunction with FIG. 1 and FIG. 2.

For understanding clearly, the terms used in the specification are defined as follows:

$N_{sync}$ represents a number of the synchronization sequences defined by the communication system;

$L_{sync}$ represents a length of the synchronization sequence defined by the communication system;

$L_{sf}$ represents a length of one frame data in the communication system;

r(k) (k=1, . . . , $L_{sf}$+$L_{sync}$) represents a received frame data sequence;

Pr(k) (k=1, . . . , $L_{sf}$+$L_{sync}$) represents a power sequence of the received frame data sequence;

Sn(m) (m=1, . . . , $L_{sf}$) represents a waveform data in time domain of the $n^{th}$ synchronization sequence;

Pn(j) (j=1, . . . , $L_{sf}$) represents a power sequence of a correlation sequence between the $n^{th}$ synchronization sequence and the received frame data sequence, which is referred to as a correlation power sequence for short;

P'n(j) (j=1, . . . , $L_{sf}$) represents a normalized correlation power sequence of the $n^{th}$ synchronization sequence;

$P_{n,max1}$ represents a maximum of the normalized correlation power sequence of the $n^{th}$ synchronization sequence, which is referred to as a highest peak;

$P_{n,max2}$ represents a second maximum of the normalized correlation power sequence of the $n^{th}$ synchronization sequence, which is referred to as a secondary peak;

$T_{n,max1}$ represents a corresponding position of the highest peak of the $n^{th}$ synchronization sequence;

$T_{n,max2}$ represents a corresponding position of the secondary peak of the $n^{th}$ synchronization sequence; and $Threshold_{dist}$ represents a threshold of a distance.

Referring to FIG. 2, the initial cell searching method of a user equipment includes the following steps.

In S21, receiving one frame data sequence including signals transmitted on synchronization channel. Specifically, the user equipment receives one frame data sequence r(k), where the data sequence r(k) includes synchronization channel signals.

After receiving the frame data sequence, the method goes to S22, calculating power of the received data sequence. Specifically, the user equipment calculates power of the received data sequence r(k), to obtain a power sequence Pr(k) of the received one frame data sequence r(k).

In S23, computing all synchronization sequences in a circular manner by increasing n from 1 to $N_{sync}$, where n represents serial number of the synchronization sequences. According to embodiments of the present disclosure, "computing all synchronization sequences in a circular manner" includes that the user equipment performing correlation processes between the $N_{sync}$ synchronization sequences and the received data sequences r(k) to obtain correlation sequences; calculating correlation power sequences Pn(j) corresponding to each of the correlation sequences; and searching the highest peak $P_{n,max1}$ and its corresponding position $T_{n,max1}$, together with the secondary peak $P_{n,max2}$ and its corresponding position $T_{n,max1}$ for each of the correlation power sequences. The step S23 corresponds to S2 and S3 shown in FIG. 1.

In some embodiments, the serial number n of the synchronization sequences increases by 1 every time when a synchronization sequence is computed in one cycle. Thus, for the whole cycles, all the synchronization sequences are computed with n increasing from 1 to $N_{sync}$.

In S24, performing a correlation process between the $n^{th}$ synchronization sequence and the received at least one frame data sequences to obtain a correlation sequence.

In some embodiments, "perform a correlation process" means that a process of correlation matching between synchronization sequences stored in the user equipment and the received at least one frame data sequence. The correlation matching may be achieved, but not limited thereto, in two ways. The first way is to perform a slide correlation successively between a waveform data in time domain of the synchronization sequence and the received data sequence. The second way is to transform the synchronization sequence and the received data sequence to frequency domain and perform a dot product of the transformed data in frequency domain.

In the first way, the user equipment may perform the slide correlation successively between waveform data in time domain of all synchronization sequences stored in the user equipment and the received at least one frame data sequence. In embodiments of the present description, the first way is used to achieve correlation matching. Specifically, the user equipment performs a slide correlation between waveform data Sn(m) in time domain of the $n^{th}$ synchronization sequence stored in the user equipment and the received one frame data sequence r(k), to obtain a correlation sequence between the $n^{th}$ synchronization sequence and the received one frame data sequence, where the correlation sequence includes a group of correlation values.

A plurality of ways may be used to perform the slide correlation. In some embodiments, a segmented search way may be used, where each of the synchronization sequences needs to be segmented before performing a slide correlation. In this way, the user equipment performs the correlation process between the segmented synchronization sequences and the received at least one frame data sequence.

In some other embodiments, the second way may be used to perform the correlation process. Specifically, the synchronization sequence and the received at least one frame data sequence are transformed from time domain to frequency domain via fast fourier transform (FFT). Then a dot product is done with the transformed sequences in frequency domain. As such, computation amount can be saved.

It should be noted that performing the slide correlation between the synchronization sequences stored in the user equipment and the received at least one frame data sequence, or doing a dot product in frequency domain are well known to those skilled in the art, and will not be described in detail herein.

After S24, the method goes to S25, calculating on the correlation sequence to obtain a corresponding correlation power sequence.

In the embodiment of the present description, the user equipment calculates a correlation power sequence Pn(j) corresponding to the correlation sequence which is obtained by performing a slide correlation between the $n^{th}$ synchronization sequence and the received one frame data sequence r(k).

After the $n^{th}$ correlation power sequence is obtained, the method goes to S26, calculating normalized power of the $n^{th}$ correlation power sequence. In S26, calculating the normalized power of a correlation power sequence includes calculating a normalized power for each value of the correlation power sequence.

In the embodiment of the present description, the normalized power of the correlation power sequence is a ratio between each value of the correlation power sequence and a power sum of the corresponding received at least one frame data sequence in a correlation length. Specifically, the user equipment may calculate the $j^{th}$ normalized power value P'n(j) of the $n^{th}$ correlation power sequence Pn(j) according to Equation (1), so as to obtain a normalized correlation power value P'n(j) of the $n^{th}$ synchronization sequence.

$$P'n(j) = \frac{Pn(j)}{\sum_{i=j}^{i=j+N_{sync}} Pr(i)} \quad (j=1, \ldots, L_{sf}) \quad \text{Equation (1)}$$

In the embodiment of the present description, before searching the highest peak and the secondary peak for each of the correlation power sequences, computations are needed for all the correlation power sequences to obtain normalized power values respectively. In some embodiments, searching the highest peak and the secondary peak for each of the correlation power sequences may includes searching a maximum value of the normalized power and a second maximum value of the normalized power for each of the correlation power sequences. By calculating the normalized power for each of the correlation power sequences, interference can be resisted and accuracy of searching the highest peak and the secondary peak in subsequent processes can be improved.

In some other embodiments, searching the highest peak and the secondary peak for each of the correlation power sequences may include searching a maximum power value and a second maximum power value for each of the correlation power sequences, where the maximum power value serves as the highest peak, and the second maximum power value serves as the secondary peak.

In addition, in S26, the normalized power is defined as a ratio between each value of the correlation power sequence and the power sum of the corresponding received data sequence in the correlation length. It should be noted to those skilled in the art that the normalization may be implemented in other ways.

After S26, the method goes to S27, searching the maximum of the normalized power of the $n^{th}$ correlation power sequence and its corresponding position, and to S28, searching the second maximum of the normalized power of the $n^{th}$ correlation power sequence and its corresponding position.

Specifically, the user equipment searches the maximum and the second maximum of the normalized correlation power sequence of the $n^{th}$ synchronization sequence P'n(j), records the maximum and its corresponding position as $P_{n,max1}$ and $T_{n,max1}$, and records the second maximum and its corresponding position as $P_{n,max2}$ and $T_{n,max2}$. $P_{n,max1}$ represents the maximum value of the normalized power of the $n^{th}$ correlation power sequence, which may be referred to as the highest peak. $T_{n,max1}$ represents a corresponding position of the highest peak. $P_{n,max2}$ represents the second maximum value of the normalized power of the $n^{th}$ correlation power sequence, which may be referred to as the secondary peak. $T_{n,max2}$ represents a corresponding position of the secondary peak.

The highest peak $P_{n,max1}$ and its corresponding position $T_{n,max1}$, the secondary peak $P_{n,max2}$ and its corresponding position $T_{n,max2}$ may be calculated in the following way.

```
Initialization:   P_{n,max1}=0, T_{n,max1}=0, P_{n,max2}=0, and T_{n,max2}=0
For j=1: N_sf
    If P'n(j)>P_{n,max1}
        Firstly, update the secondary peak:
            P_{n,max2}= P_{n,max1}
            T_{n,max2}= T_{n,max1}
        Secondly, update the highest peak:
            P_{n,max1}= P'n(j)
            T_{n,max1}=j
    Else if P'n(j)> P_{n,max2}
        Update the secondary peak:
            P_{n,max2}= P'n(j)
            T_{n,max2}=j
    End
end
```

It can be observed from the above process that searching the highest peak and searching the secondary peak are performed simultaneously, which thus reduces computation amount of the initial cell searching method provided in the present disclosure.

Figure 3:
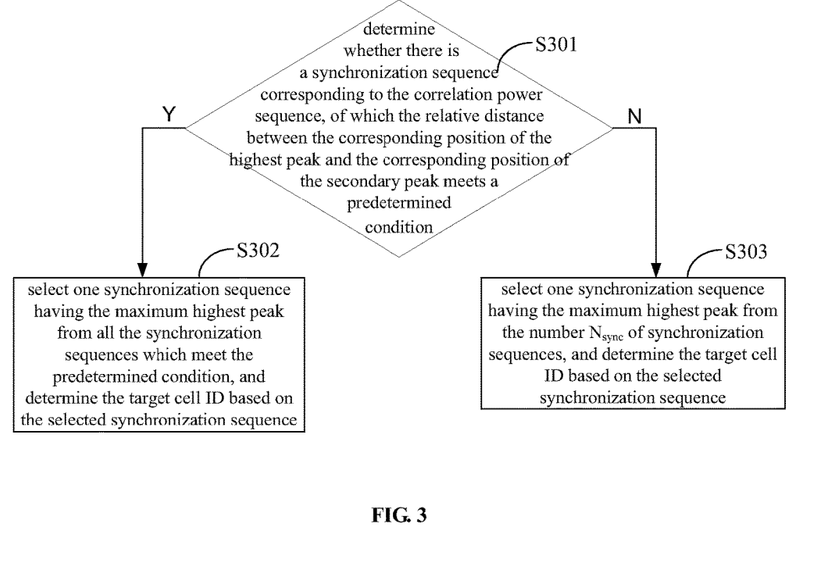
FIG. 3 schematically illustrates a flow chart of implementation of step S30 shown in FIG. 2.

After S27 and S28, the method goes to S29: determining whether the whole cycles are finished for all the synchronization sequences. If yes, the method goes to S30; otherwise, the method returns to S23: performing n=n+1, and repeating the subsequent processes.

In S29, if $n<N_{sync}$, the whole cycles for all the synchronization sequences are determined to be not finished. Then, plusing n by one, and performing S24 to S28 on a next $(n+1^{th})$ synchronization sequence of the $n^{th}$ synchronization sequence. Otherwise, the whole cycles for all the synchronization sequences are determined to be finished. And, the produced result may be used to detect the target cell ID.

After the whole cycles for all the synchronization sequences are finished, the method goes to S30, detecting the target cell ID.

In some embodiments, after the whole cycles for all the synchronization sequences are finished, the highest peak and its corresponding position, together with the secondary peak and its corresponding position for each of the correlation power sequences can be obtained, which can be used in S30 to determine the target cell ID.

The specific implementation of S30 is described in detail with reference to FIG. 3.

In S301, determining whether there is a synchronization sequence corresponding to the correlation power sequence, of which a relative distance between the corresponding position of the highest peak and the corresponding position of the secondary peak meets a predetermined condition.

In some embodiments, the relative distance between the corresponding position of the highest peak and the corresponding position of the secondary peak meeting a predetermined condition means that: an absolute difference between the relative distance between the corresponding position of the highest peak and the corresponding position of the secondary peak and the length of the synchronization sequence is less than a predetermined threshold. In some embodiments, the predetermined threshold is a threshold of a distance, namely $Threshold_{dist}$, which may be predetermined according to specific conditions of multi-path delay under a communication circumstance.

Specifically, all the synchronization sequences may be determined according to equation (2).

$$||T_{n,max1}-T_{n,max2}|-L_{sync}|<Threshold_{dist} \quad \text{equation (2)}$$

In equation (2), |x| represents evaluation of an absolute value.

If the determination in S301 is yes, the method goes to S302, selecting one synchronization sequence having the maximum highest peak from all the synchronization sequences which meet the predetermined condition, and determining the target cell ID based on the selected synchronization sequence.

In some embodiments, if more than one synchronization sequences meet the predetermined condition, the synchronization sequence having the maximum of the highest peak may be selected from the more than one synchronization sequences. The cell ID corresponding to the synchronization sequence having the maximum of the highest peak is the target cell ID, and the peak position is a synchronization timing position.

Specifically, for all the synchronization sequences meeting the equation (2), the values of $P_{n,max1}$ of all the synchronization sequences are compared. The synchronization sequence having the maximum $P_{n,max1}$ among all the synchronization sequences meeting the predetermined condition is called as a first target sequence. And the cell ID corresponding to the first target sequence is the target cell ID, and its corresponding position $T_{n,max1}$ is the synchronization timing position.

If the determination in S301 is no, the method goes to S303, selecting one synchronization sequence having the maximum of the highest peak from the number $N_{sync}$ of synchronization sequences, and determining the target cell ID based on the selected synchronization sequence.

In some embodiments, if no synchronization sequences meets the predetermined condition, the values of $P_{n,max1}$ of all the synchronization sequences are compared to obtain a maximum $P_{n,max1}$. The synchronization sequence having the maximum $P_{n,max1}$ is called as the second target sequence. And the cell ID corresponding to the second target sequence is the target cell ID, and its corresponding position $T_{n,max1}$ is the synchronization timing position.

In addition, S30 is performed by the user equipment to determine for each synchronization sequence whether the relative distance between the corresponding position of the highest peak and the corresponding position of the secondary peak equals to the length of the synchronization sequence, if yes, the synchronization sequence is classified into dual-peak sequences, otherwise, the synchronization sequence is classified into single-peak sequences.

The target cell ID is determined preferentially among the dual-peak sequences. That is, the target cell ID is the cell ID corresponding to the maximum highest peak of the dual-peak sequences. If there is no dual-peak sequence, the target cell ID is the cell ID corresponding to the maximum highest peak of the single-peak sequences. A position corresponding to the maximum highest peak of the target sequence (including the first target sequence and the second target sequence) is the synchronization timing position.

In some embodiments, when the initial cell searching is finished, and if a target cell ID is obtained successfully, other information of this cell is analyzed. Otherwise, a new round of search is performed.

It should be noted that the initial cell searching method is described based on the example of receiving one frame data sequence including signals transmitted by a synchronization channel. In some other embodiments, the method may include receiving more than one frame data sequences and performing data superposition on the more than one frame data in a certain way. Alternatively, the method may include processing the more than one frame data and performing data superposition on the correlation processed data in a certain way, so as to improve performance by utilizing diversity gain in time.

Figure 5:
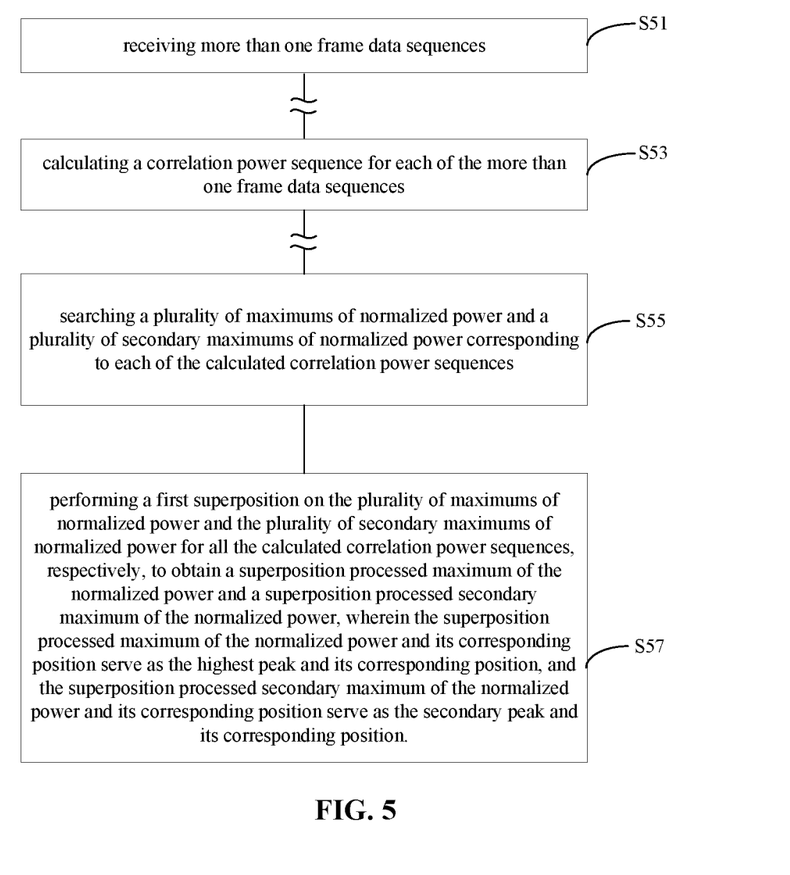
FIG. 5 schematically illustrates a flow chart of an initial cell searching method according to another embodiment of the present disclosure.

Referring to FIG. 5, in some embodiments, the initial cell searching method of the user equipment may include: step S51, receiving more than one frame data sequences; step S53, calculating a correlation power sequence for each of the more than one frame data sequences; step S55, searching a plurality of maximums of normalized power and a plurality of secondary maximums of normalized power corresponding to each of the calculated correlation power sequences; step S57, and performing a first superposition on the plurality of maximums of normalized power and the plurality of secondary maximums of normalized power for all the calculated correlation power sequences, respectively, to obtain a superposition processed maximum of the normalized power and a superposition processed secondary maximum of the normalized power, wherein the superposition processed maximum of the normalized power and its corresponding position serve as the highest peak and its corresponding position, and the superposition processed secondary maximum of the normalized power and its corresponding position serve as the secondary peak and its corresponding position.

Figure 6:
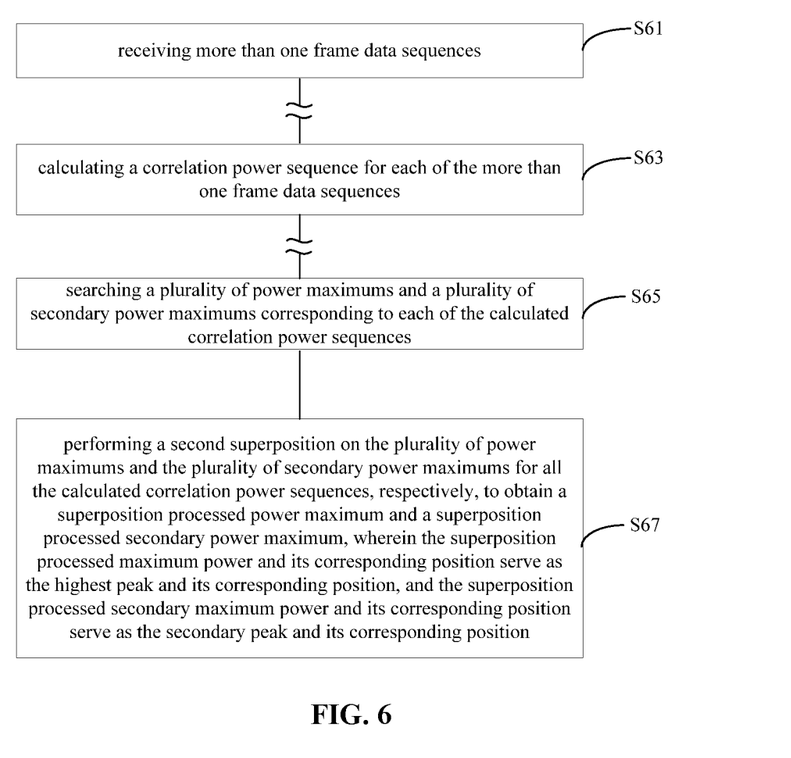
FIG. 6 schematically illustrates a flow chart of an initial cell searching method according to another embodiment of the present disclosure.

Referring to FIG. 6, in some other embodiments, the initial cell searching method of the user equipment may include: step S61, receiving more than one frame data sequences; step S63, calculating a correlation power sequence for each of the more than one frame data sequences; step S65, searching a plurality of power maximums and a plurality of secondary power maximums corresponding to each of the calculated correlation power sequences; and step S67, performing a second superposition on the plurality of power maximums and the plurality of secondary power maximums for all the calculated correlation power sequences, respectively, to obtain a superposition processed power maximum and a superposition processed secondary power maximum, wherein the superposition processed maximum power and its corresponding position serve as the highest peak and its corresponding position, and the superposition processed secondary maximum power and its corresponding position serve as the secondary peak and its corresponding position.

Figure 7:
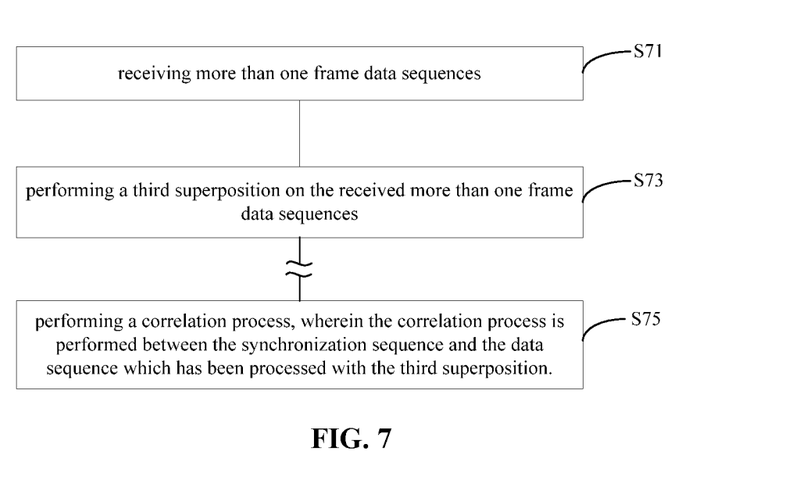
FIG. 7 schematically illustrates a flow chart of an initial cell searching method according to another embodiment of the present disclosure.

Referring to FIG. 7, in some other embodiments, the initial cell searching method of the user equipment may include: step S71, receiving more than one frame data sequences; step S73, performing a third superposition on the received more than one frame data sequences; step S75, performing a correlation process, wherein the correlation process is performed between the synchronization sequence and the data sequence which has been processed with the third superposition.

Figure 8:
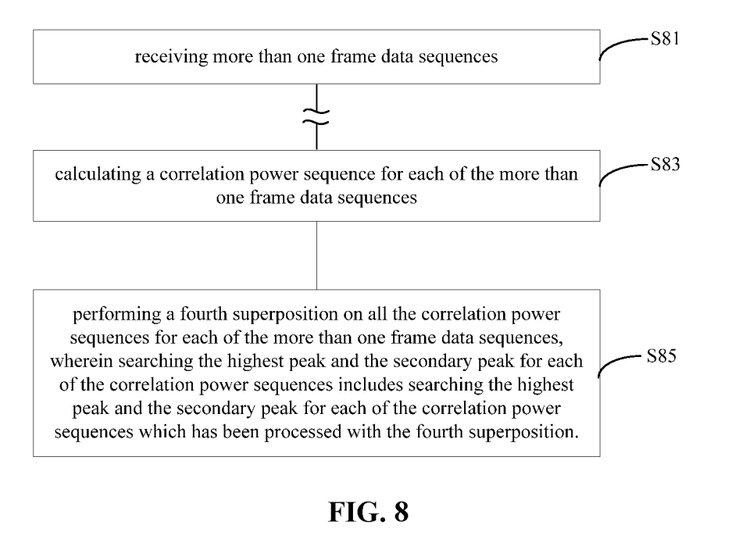
FIG. 8 schematically illustrates a flow chart of an initial cell searching method according to another embodiment of the present disclosure.

Referring to FIG. 8, in some other embodiments, the initial cell searching method of the user equipment may include: step S81, receiving more than one frame data sequences; step S83, calculating a correlation power sequence for each of the more than one frame data sequences; and, step S85, performing a fourth superposition on all the correlation power sequences for each of the more than one frame data sequences, wherein searching the highest peak and the secondary peak for each of the correlation power sequences includes searching the highest peak and the secondary peak for each of the correlation power sequences which has been processed with the fourth superposition.

In some embodiments, the first superposition, the second superposition, the third superposition and the fourth superposition may be implemented using an averaging method for multiple frames, such as averaging the highest peaks and the secondary peaks of the more than one frame data sequences, or averaging directly the more than one frame data sequences, or averaging the correlation power sequences of the more than one frame data sequences, which thus can improve accuracy of the initial cell searching by utilizing diversity gain in time to some extent.

In addition to the averaging method for multiple frames, finding the maximum of the multiple frames search results may be performed to improve searching performance. In some other embodiments, the initial cell searching method of the user equipment may include: receiving more than one frame data sequences; searching a first target sequence for each of the more than one frame data sequences; and comparing the highest peak for all the searched first target sequences to obtain a maximum highest peak, wherein the first target sequence having the maximum highest peak is used to determine the target cell ID.

It should be noted that the initial cell searching method is described based on the example of searching a target sequence on one frequency point to determine the target cell ID. In some other embodiments, searching on multiple frequency points may be used to determine the target cell ID. That is, the steps S21 to S29 may be performed repeatedly on multiple frequency points. And the results on multiple frequency points are synthesized to perform S30 to get the optimized result.

Specifically, the method may includes: scanning more than one frequency point to search a first target sequence on each of the more than one frequency point; comparing the highest peak for all the searched first target sequences to obtain the maximum highest peak, wherein the first target sequence having the maximum highest peak is used to determine the target cell ID.

The method may includes: if no first target sequence is found on all frequency points, comparing the highest peak for all the second target sequences to obtain a maximum highest peak, wherein the second target sequence having the maximum highest peak is used to determine the target cell ID, wherein the second target sequence corresponds to a synchronization sequence corresponding to a correlation power sequence having a maximum highest peak among all the correlation power sequences on each frequency point which fail to meet the predetermined condition.

In some embodiments, integer-frequency-offset compensation and decimal-frequency-offset compensation may be used to further improve the cell searching performance.

Figure 4:
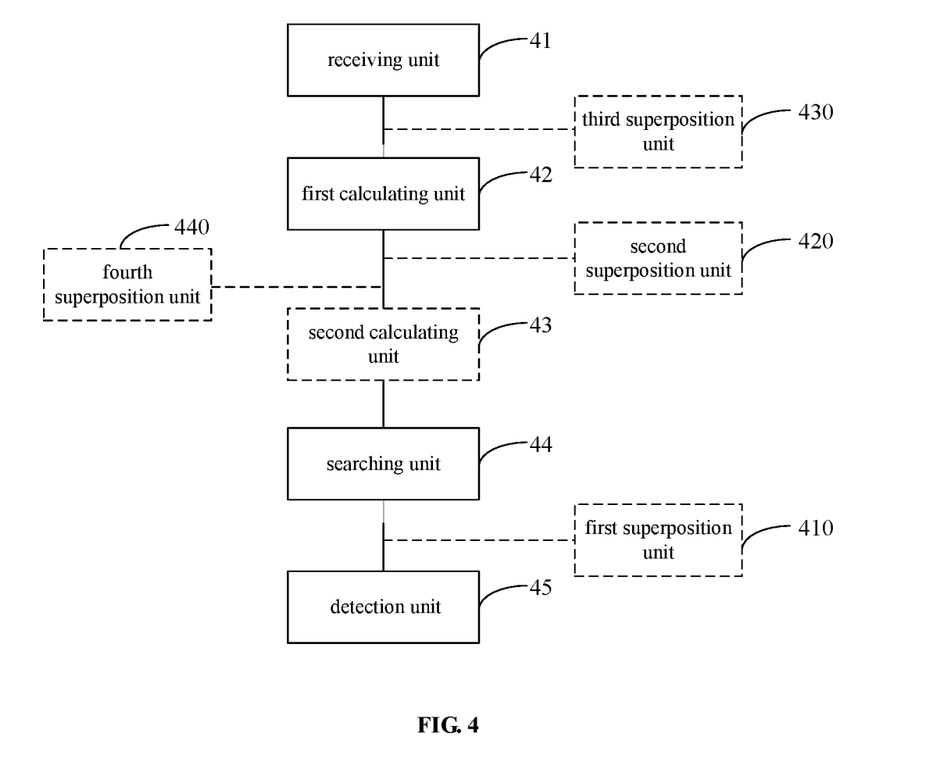
FIG. 4 schematically illustrates a structural diagram of an initial cell searching apparatus according to an embodiment of the present disclosure.

In accordance with the initial cell searching method of a user equipment, an initial cell searching apparatus of a user equipment is provided to improve accuracy of identifying a cell ID. Referring to FIG. 4, the initial cell searching apparatus of a user equipment includes: a receiving unit 41, configured to receive at least one frame data sequence including synchronization channel signals; a first calculating unit 42, configured to perform a correlation process between all synchronization sequences stored in the user equipment and the received at least one frame data sequence to obtain correlation sequences, and calculate correlation power sequences corresponding to each of the correlation sequences; a searching unit 44, configured to search a highest peak and a secondary peak for each of the correlation power sequences, and record the highest peak and its corresponding position and the secondary peak and its corresponding position; and a detection unit 45, configured to determine a target cell ID based on a first target sequence, wherein the first target sequence corresponds to a synchronization sequence corresponding to a correlation power sequence of which a relative distance between the corresponding position of the highest peak and the corresponding position of the secondary peak meets a predetermined condition, and the highest peak of the correlation power sequence is a maximum one among all the correlation power sequences.

In some embodiments, the detection unit 45 is further configured to: if the first target sequence does not exist, determine the target cell ID based on a second target sequence, wherein the second target sequence corresponds to a synchronization sequence corresponding to a correlation power sequence having a maximum highest peak among all the correlation power sequences which fail to meet the predetermined condition.

In some embodiments, the initial cell searching apparatus of a user equipment further includes a second calculating unit 43 configured to: before the searching unit 44 searching the highest peak and the secondary peak for each of the correlation power sequence, calculate all the correlation power values one by one to obtain normalized power values, wherein the searching unit 44 searching the highest peak and the secondary peak for each of the correlation power sequence includes searching a maximum value of the normalized power and a second maximum value of the normalized power for each of the correlation power sequences.

In embodiments of the present description, the initial cell searching apparatus of a user equipment can be implemented effectively based on the ground that the synchronization sequence maps to a frequency domain position on the synchronization channel in an alternate way, where mapping in an alternate way means that the synchronization sequence is mapped only to an odd-numbered sub-carrier or to an even-numbered sub-carrier.

In some embodiments, the detection unit 45 determining whether or not the relative distance between the corresponding position of the highest peak and the corresponding position of the secondary peak meets a predetermined condition includes: determining whether or not an absolute difference between the relative distance between the corresponding position of the highest peak and the corresponding position of the secondary peak and the length of the synchronization sequence is less than a predetermined threshold. If yes, the relative distance between the corresponding position of the highest peak and the corresponding position of the secondary peak meets the predetermined condition. Otherwise, the relative distance between the corresponding position of the highest peak and the corresponding position of the secondary peak does not meet the predetermined condition.

In some embodiments, the initial cell searching apparatus of a user equipment further includes a first superposition unit 410 (as shown in FIG. 4) configured to: after receiving more than one frame data sequences and calculating a correlation power sequence for each of the more than one frame data sequences, perform a first superposition on the maximum value of the normalized power and the second maximum value of the normalized power for all the calculated correlation power sequences, respectively, to obtain a superposition processed maximum of the normalized power and a superposition processed second maximum of the normalized power, wherein the superposition processed maximum of the normalized power and its corresponding position serve as the highest peak and its corresponding position, and the superposition processed second maximum of the normalized power and its corresponding position serve as the secondary peak and its corresponding position.

In some embodiments, the initial cell searching apparatus of a user equipment further includes a segment unit (not shown in FIG. 4) configured to segment each of the synchronization sequences, wherein the first calculating unit 42 is configured to perform a correlation process between the segmented synchronization sequences and the received at least one frame data sequence.

In some embodiments, the searching unit 44 searching the highest peak and the secondary peak for each of the correlation power sequences includes: searching a maximum power value and a second maximum power value for each of the correlation power sequences. In some embodiments, the initial cell searching apparatus of a user equipment further includes a second superposition unit 420 (as shown in FIG. 4) configured to: after receiving more than one frame data sequences and calculating a correlation power sequence for each of the more than one frame data sequences, perform a second superposition on the maximum power values and the second maximum power values for all the calculated correlation power sequences, respectively, to obtain a superposition processed maximum power and a superposition processed second maximum power, wherein the superposition processed maximum power and its corresponding position serve as the highest peak and its corresponding position, and the superposition processed second maximum power and its corresponding position serve as the secondary peak and its corresponding position.

In some embodiments, the initial cell searching apparatus of a user equipment further includes a third superposition unit 430 (as shown in FIG. 4) configured to: before performing a correlation process, perform a third superposition for each of the received more than one frame data sequences, wherein the first calculating unit is configured to perform a correlation process between the synchronization sequence and the data sequences which have been processed with the third superposition.

In some embodiments, the initial cell searching apparatus of a user equipment further includes a fourth superposition unit 440 (as shown in FIG. 4) configured to: after receiving more than one frame data sequences and calculating a correlation power sequence for each of the more than one frame data sequences, perform a fourth superposition on all the correlation power sequences corresponding to each of the more than one frame data sequences, wherein searching the highest peak and the secondary peak for each of the correlation power sequences includes searching the highest peak and the secondary peak for each of the correlation power sequences which has been processed with the fourth superposition.

In some embodiments, the detection unit is further configured to: after receiving more than one frame data sequences and searching a first target sequence for each of the more than one frame data sequences, compare the highest peak for all the searched first target sequences to obtain the maximum highest peak, wherein the first target sequence having the maximum highest peak is used to determine the target cell ID.

In some embodiments, the initial cell searching apparatus of a user equipment further includes a scanning unit configured to scan more than one frequency point to search a first target sequence on each of the more than one frequency point, wherein the detection unit is further configured to compare the highest peak for all the searched first target sequences to obtain a maximum highest peak, wherein the first target sequence having the maximum highest peak is used to determine the target cell ID. In some embodiments, if the initial cell searching apparatus fails to find such a first target sequence on all frequency points, the detection unit is further configured to compare the highest peak for all the second target sequences to obtain a maximum highest peak, wherein the second target sequence having the maximum highest peak is used to determine the target cell ID, wherein the second target sequence corresponds to a synchronization sequence corresponding to a correlation power sequence having a maximum highest peak among all the correlation power sequences on each frequency point which fail to meet the predetermined condition.

In addition, a user equipment including the initial cell searching apparatus described above is provided.

The implementations of the user equipment and the initial cell searching apparatus may refer to embodiments of the initial cell searching method described above, which are not described in detail herein.

It will be apparent to those skilled in the art that some or all of the user equipment and the initial cell searching apparatus provided in embodiments of the present disclosure may be performed by related hardwares in response to some computer programs. The computer programs may be stored in a computer-readable storage medium. The storage medium may be an optical disk, a magnetic disk, a Read-Only Memory (ROM), or a Random Access Memory (RAM), etc.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:
1. An initial cell searching method, comprising:
receiving at least one frame data sequence including synchronization channel signals;
performing a correlation process between all synchronization sequences stored in a user equipment and the received at least one frame data sequence to obtain correlation sequences, and calculating correlation power sequences corresponding to each of the correlation sequences;

searching a highest peak with a maximum power value and a secondary peak with a second maximum power value for each of the correlation power sequences, and recording a power value of the highest peak and a corresponding position of the highest peak in a time domain and a power value of the secondary peak and a corresponding position of the secondary peak in the time domain for each of the correlation power sequences;

determining whether there is a synchronization sequence corresponding to a correlation power sequence of which a relative distance between the corresponding position of the highest peak and the corresponding position of the secondary peak meets a predetermined condition; and if the determination meets the predetermined condition, determining a target cell identification (ID) based on a first target sequence, where the first target sequence is a synchronization sequence corresponding to a correlation power sequence having a maximum highest peak value among all the correlation power sequences which meet the predetermined condition;

wherein the relative distance between the corresponding position of the highest peak and the corresponding position of the secondary peak meeting the predetermined condition comprises: an absolute difference between the relative distance between the corresponding position of the highest peak and the corresponding position of the secondary peak and a length of the synchronization sequence is less than a predetermined threshold.

2. The method according to claim 1, wherein the corresponding position of the highest peak in the time domain of the correlation power sequence corresponding to the synchronization sequence which is used to determine the target cell ID is determined to be a synchronization timing position.

3. The method according to claim 1, wherein performing a correlation process comprises: performing a slide correlation successively between waveform data in the time domain of all the synchronization sequences and the received at least one frame data sequence; or, transforming all the synchronization sequences and the received at least one frame data sequence into frequency domain and performing a dot product of the transformed sequences in frequency domain.

4. The method according to claim 1, wherein the method further comprises: before searching the highest peak and the secondary peak for each of the correlation power sequences, calculating normalized power values of all the correlation power values one by one, wherein searching the highest peak and the secondary peak for each of the correlation power sequences comprises searching a maximum value of the normalized power and a second maximum value of the normalized power for each of the correlation power sequences.

5. The method according to claim 4, wherein the normalized power of the correlation power sequence is a ratio between the correlation power sequence and a power sum of a corresponding received data sequence in a correlation length.

6. The method according to claim 4, wherein the method further comprises: calculating a correlation power sequence for each of the received at least one frame data sequences; and performing a first superposition on the maximum value of the normalized power and the second maximum value of the normalized power for all the calculated correlation power sequences, respectively, to obtain a superposition processed maximum of the normalized power and a superposition processed second maximum of the normalized power, wherein the superposition processed maximum of the normalized power and its corresponding position in the time domain serve as the power value of the highest peak and the corresponding position of the highest peak, and the superposition processed second maximum of the normalized power and its corresponding position in the time domain serve as the power value of the secondary peak and the corresponding position of the secondary peak.

7. The method according to claim 1, wherein the method further comprises: calculating a correlation power sequence for each of the received at least one frame data sequences; and performing a second superposition on the maximum power values and the second maximum power values for all the calculated correlation power sequences, respectively, to obtain a superposition processed maximum power and a superposition processed second maximum power, wherein the superposition processed maximum power and its corresponding position in the time domain serve as the power value of the highest peak and the corresponding position of the highest peak, and the superposition processed second maximum power and its corresponding position serve as the power value of the secondary peak and the corresponding position of the secondary peak.

8. The method according to claim 1, wherein the method further comprises: segmenting each of the synchronization sequences, wherein the correlation process is performed between the segmented synchronization sequences and the received at least one frame data sequence.

9. The method according to claim 1, wherein the method further comprises: before performing the correlation process, performing a third superposition on each of the received at least one frame data sequences, wherein the correlation process is performed between a synchronization sequence and a data sequence which has been processed with the third superposition.

10. The method according to claim 1, wherein the method further comprises: calculating a correlation power sequence for each of the received at least one frame data sequences; and, performing a fourth superposition on all the correlation power sequences for each of the at least one frame data sequences, wherein searching the highest peak and the secondary peak for each of the correlation power sequences comprises searching a highest peak with a maximum power value and a secondary peak with a second maximum power value for each of the correlation power sequences which has been processed with the fourth superposition.

11. The method according to claim 1, wherein the method further comprises: searching the first target sequence for each of the received at least one frame data sequences; and comparing the highest peaks for all the searched first target sequences to obtain a highest peak with a maximum power value, wherein the first target sequence having the highest peak with the maximum power value is used to determine the target cell ID.

12. The method according to claim 1, wherein the method further comprises: scanning more than one frequency point to search the first target sequence on each of the more than one frequency point; comparing the highest peaks for all the searched first target sequences to obtain a highest peak with a maximum power value, wherein the first target sequence having the highest peak with the maximum power value is used to determine the target cell ID.

13. The method according to claim 1, wherein the synchronization sequence is mapped to a frequency domain position on the synchronization channel in an alternate way, where mapping the synchronization sequence in the alternate way means that the synchronization sequence is mapped only to an odd-numbered sub-carrier or to an even-numbered sub-carrier.

14. The method according to claim 1, further comprising:
if the determination does not meet the predetermined condition, determining the target cell ID based on a second target sequence, where the second target sequence is a synchronization sequence corresponding to a correlation power sequence having a maximum highest peak value among all the correlation power sequences which fail to meet the predetermined condition.

15. An initial cell searching apparatus, comprising:
a receiving unit, configured to receive at least one frame data sequence including synchronization channel signals;
a first calculating unit, configured to perform a correlation process between all synchronization sequences stored in a user equipment and the received at least one frame data sequence to obtain correlation sequences, and calculate correlation power sequences corresponding to each of the correlation sequences;
a searching unit, configured to search a highest peak with a maximum power value and a secondary peak with a second maximum power value for each of the correlation power sequences, and record a power value of the highest peak and a corresponding position of the highest peak in a time domain and a power value of the secondary peak and a corresponding position of the secondary peak in the time domain for each of the correlation power sequences; and
a detection unit, configured to determine a target cell ID based on a first target sequence if the first target sequence exists, wherein the first target sequence corresponds to a synchronization sequence corresponding to a correlation power sequence of which a relative distance between the corresponding position of the highest peak and the corresponding position of the secondary peak meets a predetermined condition, and the correlation power sequence has a maximum highest peak value among all the correlation power sequences which meet the predetermined condition;
wherein the relative distance between the corresponding position of the highest peak and the corresponding position of the secondary peak meeting the predetermined condition comprises: an absolute difference between the relative distance between the corresponding position of the highest peak and the corresponding position of the secondary peak and a length of the synchronization sequence is less than a predetermined threshold.

16. The apparatus according to claim 15, further comprising a second calculating unit configured to: before the searching unit searching the highest peak with the maximum power value and the secondary peak with the second maximum power value for each of the correlation power sequence, calculate normalized power values of all the correlation power values one by one, wherein the searching unit searching the highest peak with the maximum power value and the secondary peak with the second maximum power value for each of the correlation power sequence comprises searching a maximum value of the normalized power and a second maximum value of the normalized power for each of the correlation power sequences.

17. The apparatus according to claim 16, further comprising a first superposition unit configured to: after calculating a correlation power sequence for each of the received at least one frame data sequences, perform a first superposition on the maximum values of the normalized power and the second maximum values of the normalized power for all the calculated correlation power sequences, respectively, to obtain a superposition processed maximum of the normalized power and a superposition processed second maximum of the normalized power, wherein the superposition processed maximum of the normalized power and its corresponding position in the time domain serve as the power value of the highest peak and the corresponding position of the highest peak, and the superposition processed second maximum of the normalized power and its corresponding position in the time domain serve as the secondary peak and the corresponding position of the secondary peak.

18. The apparatus according to claim 15, further comprising a second superposition unit configured to: after calculating a correlation power sequence for each of the received at least one frame data sequences, perform a second superposition on the maximum power values and the second maximum power values for all the calculated correlation power sequences, respectively, to obtain a superposition processed maximum power and a superposition processed second maximum power, wherein the superposition processed maximum power and its corresponding position in the time domain serve as the power value of the highest peak and the corresponding position of the highest peak, and the superposition processed second maximum power and its corresponding position in the time domain serve as the power value of the secondary peak and the corresponding position of the secondary peak.

19. The apparatus according to claim 15, further comprising a segment unit configured to segment each of the synchronization sequences, wherein the first calculating unit is configured to perform the correlation process between the segmented synchronization sequences and the received at least one frame data sequence.

20. The apparatus according to claim 15, further comprising a third superposition unit configured to: before performing the correlation process, perform a third superposition on each of the received at least one frame data sequences, wherein the first calculating unit is configured to perform the correlation process between the synchronization sequences and the data sequences which have been processed with the third superposition.

21. The apparatus according to claim 15, further comprising a fourth superposition unit configured to: after calculating a correlation power sequence for each of the received at least one frame data sequences, perform a fourth superposition on all the correlation power sequences for each of the at least one frame data sequences, wherein searching the highest peak with the maximum power value and the secondary peak with the second maximum power value for each of the correlation power sequences comprises searching a highest peak with a maximum power value and a secondary peak with a second maximum power value for each of the correlation power sequences which has been processed with the fourth superposition.

22. A user equipment, comprising an initial cell searching apparatus according to claim 15.

23. The apparatus according to claim 15, wherein the detection unit is further configured to: if the first target sequence does not exist, determine the target cell ID based on a second target sequence, where the second target sequence is a synchronization sequence corresponding to a correlation power sequence having a maximum highest peak value among all the correlation power sequences which fail to meet the predetermined condition.

* * * * *